United States Patent [19]

Mansfield et al.

[11] 4,169,380

[45] Oct. 2, 1979

[54] ELECTRONIC CIRCUIT ARRANGEMENT

[75] Inventors: Peter Mansfield, Chilwell; Terence Baines, Beeston, both of England

[73] Assignee: National Research Development Corporation, London, England

[21] Appl. No.: 813,423

[22] Filed: Jul. 6, 1977

[30] Foreign Application Priority Data

Jul. 8, 1976 [GB] United Kingdom ............... 28462/76

[51] Int. Cl.² .............................................. G01K 1/20
[52] U.S. Cl. ................... 73/362.4; 73/359 R; 364/557; 364/571; 235/92 PL
[58] Field of Search ............... 73/359 R, 343.5, 362.5, 73/362.4, 361, 708, 1 R; 364/557, 571; 346/29; 235/92 PL, 92 MT

[56] References Cited

U.S. PATENT DOCUMENTS

| 3,824,585 | 7/1974 | Meijer ............................... 73/359 R |
| 4,031,530 | 6/1977 | Aneshansley ..................... 73/359 R |
| 4,055,166 | 10/1977 | Simpson et al. .................. 73/343.5 |

*Primary Examiner*—Donald O. Woodiel
*Attorney, Agent, or Firm*—Cushman, Darby & Cushman

[57] ABSTRACT

A display device has its input information subject to a non-linear processing in order to compensate for the non-linearity of a sensor or in order to enhance the display. The input is periodically read and after processing is converted to a time signal by means of a down counter fed with clock pulses. The time signal is used to control the dwell time of a beam of an oscilloscope or the pen lift mechanism of a chart recorder.

9 Claims, 3 Drawing Figures

ELECTRONIC CIRCUIT ARRANGEMENT

This invention relates to display devices. Such devices may provide a permanent or temporary two-dimensional record of information. The information may be a time varying parameter or a spatial distribution of a quantity. It is often the case that the input parameter or quantity may require modification to correct for (or in some cases to introduce) non-linearity in order to more advantageously display the information.

According to the present invention a display device comprises a source of input signals providing a sequence of such signals, processor means for converting the input signals to digital form according to a non-linear scale, a counter to which the digital signals are sequentially transferred, a clock pulse generator for stepping the counter, means for providing control signals each commencing with the transfer of a digital signal to the counter and terminating when the counter reaches a preset count, and display means giving visual indication in accordance with the said sequence and indicative of the durations of the control signals.

Preferably the counter comprises a down counter and the said preset count is zero.

In an embodiment of the invention the source of input signals comprises a parameter sensor, for example a temperature sensor, and the output from the sensor is applied to an analogue-to-digital converter. The output from the converter is periodically fed to the processor and thus provides a sequence of input signals for it.

In an alternative embodiment the source of input signals comprises a spatial distribution of values which is stored in a digital store having a plurality of position defining addresses. The addresses are read in an ordered sequence, for example row by row and the display means gives a visual indication at locations defined in accordance with the positions of the address.

In order that the invention may be more fully understood reference will now be made to the accompanying drawings in which.

Figure 1:
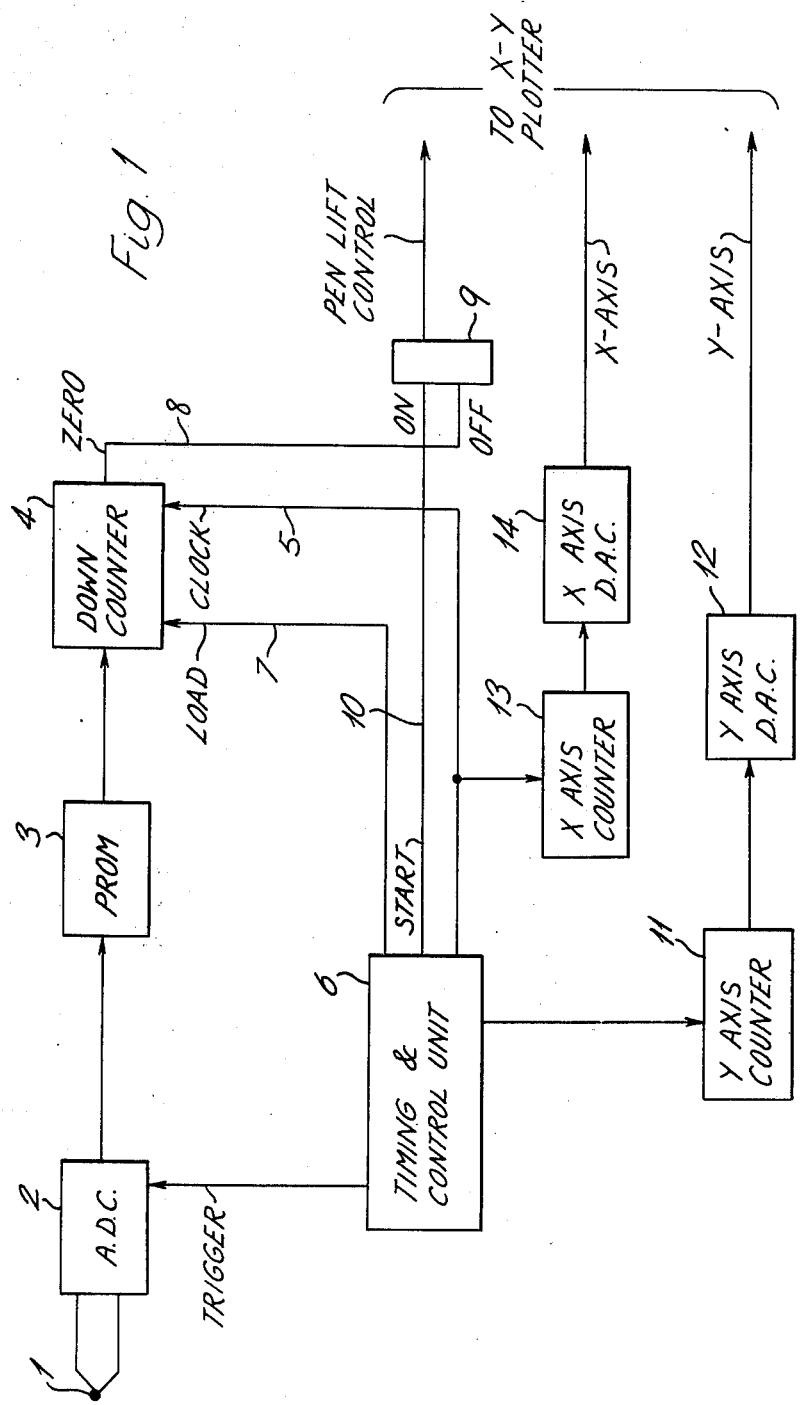
FIG. 1 illustrates an embodiment having a parameter sensor.

FIG. 1 shows a display device for the output of a parameter sensor 1, for example a temperature sensor which may take the form of a thermo-couple. A feature of many of these sensors is that they are linear over a very narrow range only. The output from sensor 1 which is in analogue form is applied to an analogue-to-digital converter 2 and from thence is fed to a processor 3 which converts the digital input thereto to a digital output in accordance with a non-linear scale. Processor 3 can conveniently take the form of a programmable read-only memory (PROM). PROM 3 is preset to compensate for the non-linearity of sensor 1. The digital output from PROM 3 is periodically loaded to a counter 4 which operates as a down counter when clock pulses are applied along a line 5.

A timing and control unit 6 periodically triggers converter 2 to provide an output to PROM 3 and then sends a load signal along a line 7 to load down counter 4 with the processed output from PROM 3. Unit 6 also provides clock pulses along line 5 to progressively reduce the count in counter 4 from its initial loaded value towards zero. When down counter 4 reaches zero an output signal is provided along line 8. Thus if converter 2 is periodically triggered it will be seen that the time interval between the trigger pulses and a pulse appearing on line 8 will be a measure of the magnitude read by sensor 1 as processed by PROM 3.

To display the information so obtained an XY plotter is provided. A pen lift control unit 9 is switched on by a start pulse along a line 10 from control unit 6 in synchronism with the triggering of converter 2 and loading of counter 4 and output pulse along line 8 operates to switch off pen lift control 9.

The Y axis of the XY plotter is driven by a signal from unit 6 which is applied to increment Y axis counter 11 in synchronism with the pen start signal and the load signal to counter 4. The output of Y axis counter 11 is applied to a Y axis digital-to-analogue converter 12 which drives the Y axis of the plotter to increment the pen along the Y axis for each successive reading.

The X axis of the XY plotter is driven by the clock pulses applied along line 5 to a X axis counter 13 and an X axis digital-to-analogue converter 14 to drive the X axis of the plotter continuously in time with the clock pulses. After the pen lift control 9 lifts off the pen at the end of each reading phase the X axis counter is reset and as described above the Y axis counter is incremented.

In this way a histogram is obtained from the plotter which represents the variation of temperature with time and with PROM 3 set to correct for the non-linearity of temperature sensor 1 the display will be linear.

This technique is not limited to the measurement and recording of temperature since any physical quantity which can be converted into an electrical signal may be so processed, nor is it limited to use with a XY plotter type of recording device. If desired a Y-t plotter can be used in which case the Y axis counter and associated circuitry of FIG. 1 will not be required.

Also thermal printers using heated writing heads and thermally sensitive papers can be used in place of a pen recorder.

In the second embodiment the information is headed in a store which can be considered as a two dimensional matrix representing for example the density variation in biological tissue.

Figure 2:
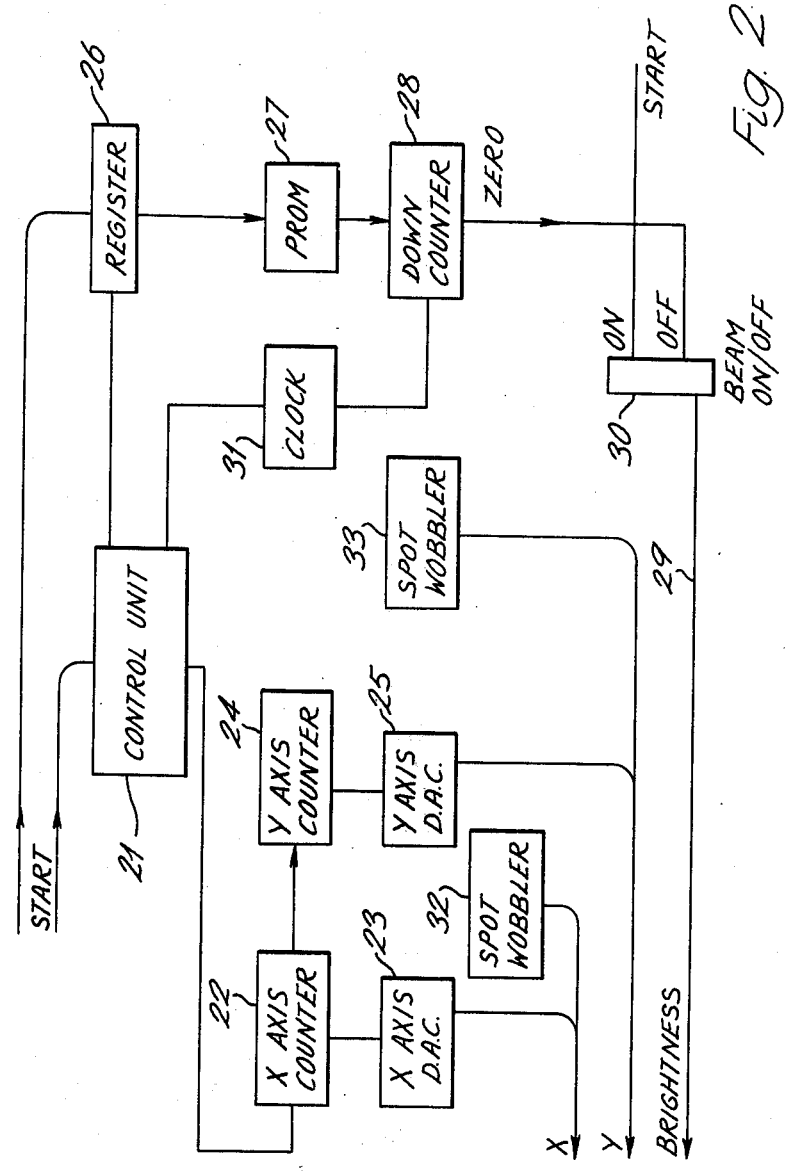
FIG. 2 illustrates an embodiment for use with an oscilloscope.

FIG. 2 shows a circuit arrangement for providing appropriate control signals to an oscilloscope (not shown). These signals are X and Y deflection signals and a brightness signal which gives on/off control of the beam without variation in beam intensity. The circuit is designed to generate an image by means of providing a square or rectangular matrix of display points arranged as a set of lines. By way of example a 128×128 matrix is suitable giving 128 points per line and 128 lines per frame. However a matrix consisting of any other convenient number of points can equally well be used and it is not necessary for the number of points per line to equal to the number of lines per frame.

A control unit 21 which includes a clock pulse generator provides deflection signals and other control signals. The output from the clock pulse generator in control unit 21 in the form of a pulse train is fed to an X axis counter 22. The instantaneous count in counter 2 is applied to a digital-to-analogue converter 23 the output of which constitutes the X axis deflection signal. A Y axis counter 24 provides the Y deflection signal through a Y axis digital-to-analogue converter 25.

Counter 22 is set to overflow when the count therein reaches the number of points per line and an output to Y-axis counter 24 is obtained whenever X-axis counter 22 overflows. Counter 24 is set to overflow when the count therein reaches the number of lines per frame.

Information in digital form proportional to the density for each successive point in the matrix is fed to a register 26 and is called down to a PROM 27 in synchronism with the pulses to X-axis counter 22. The output from PROM 27 is fed to a counter 28. A beam control signal is applied along a line 29 to the oscilloscope from a beam on/off switch 30. The beam is switched on by a start signal in synchronism with the beam deflection signal and is swtiched off when counter 28 reaches zero. Counter 28 is counted down from a clock 31 initiated in synchronism with the beam deflection signal to control unit 21.

A convenient organisation from PROM 27 is in the form of 16 locations thus enabling any location to be addressed by a 4 bit word from register 26. Each location has permanently stored a digital word of value equal to the antilogarithm of the address of that location to a suitable base. By way of example for a pulse rate of 10 MHz for clock 31 and a logarithmic base of $\sqrt{2}$ and with the data value in register 26 equal to n where n can take any value from 0 to 15 inclusive then the beam on time t is related to n by $$t = (\sqrt{2})^{n-1} \times 0.1 \, \mu s$$

It is desirable for the content of the address zero (n=0) to be zero and the number of different intensity levels can be reduced by storing a "1" in both locations 1 and 2. In order to speed up the scanning rate of the raster it is possible to reduce the value of the word stored in location 15 without noticeable distortion. Thus in the above example it is possible to truncate the longest time interval to 12.4 $\mu s$ thus enabling the clock in control unit 1 to operate on a 12.5 $\mu s$ cycle. Even so for a 128×128 matrix ¼ second is required to write a complete frame so that a reasonably long persistance phosphor is required on the oscilloscope.

In operation of the circuit described above a start pulse is applied to control unit 21 and density information in digital form is fed to register 26. These items may be fed in from an external source which may be a computer. Control unit 21 generates an enable pulse the rising edge of which causes a 24 bit word in register 26 to be fed to PROM 27 and to be presented to the address inputs thereof. After a short delay to allow the PROM output to settle clock 31 is gated on from the control unit 21. The first clock pulse loads down counter 28 with the output word from PROM 27. The second pulse from clock 31 sets the beam on/off switch 30 so that unless counter 28 was loaded with a zero switch 30 is switched on to provide a beam control signal along line 29 to switch the oscilloscope beam fully on. Subsequent pulses from clock 31 are routed to down counter 28 so that after the appropriate number of pulses from clock 31 counter 28 reaches its zero state to switch off beam switch 30 and blank out the beam.

The beam now remains blank and stationary until the first enable pulse ends. Since the longest beam on time is 12.4 $\mu s$ and each enable pulse is 12.5 $\mu s$ the beam is always blanked at the end of the enable pulse. The trailing edge of the enable pulse causes control unit 21 to provide an output to X-axis counter 21 and thus through the X-axis digital-to-analogue converter 23 steps the beam to the next point on a line. A delay of 0.4 $\mu s$ is provided for converter 23 to settle before the next enable pulse causes the next data word from register 26 to be fed to the input to PROM 27.

The X-axis counter 22 is incremented until it reaches full scale. The next pulse then resets counter 22 generating an overflow pulse which steps on the Y-axis counter 24. In this way the beam traces out a full matrix or frame. At the end of each frame the X and Y axis counters are automatically reset ready for the next frame.

To fill in the picture between matrix points two spot wobblers 32 and 33 are provided which operate at say 10 MHz and 15 MHz and are fed to the X and Y axis inputs of the oscilloscope.

Register 26 may contain more than one 4 bit word for applying to PROM 27. For example it may be convenient to load it with a 16 bit word containing the information on four successive image points in which case register 26 is filled only on every fourth enable pulse and its contents are called down to PROM 27 4 bits at a time.

Using this technique it is also possible to highlight certain features of the image. For example, the PROM translation table may be such that a non-zero output is produced by the PROM only for a single data value or for data above or below a certain level so that only those data points appear on the display. This is made possible by adding extra PROMS in parallel with the first, any PROM being selected by means of an enable input while the remainder are placed in a high-impedance off state.

Figure 3:
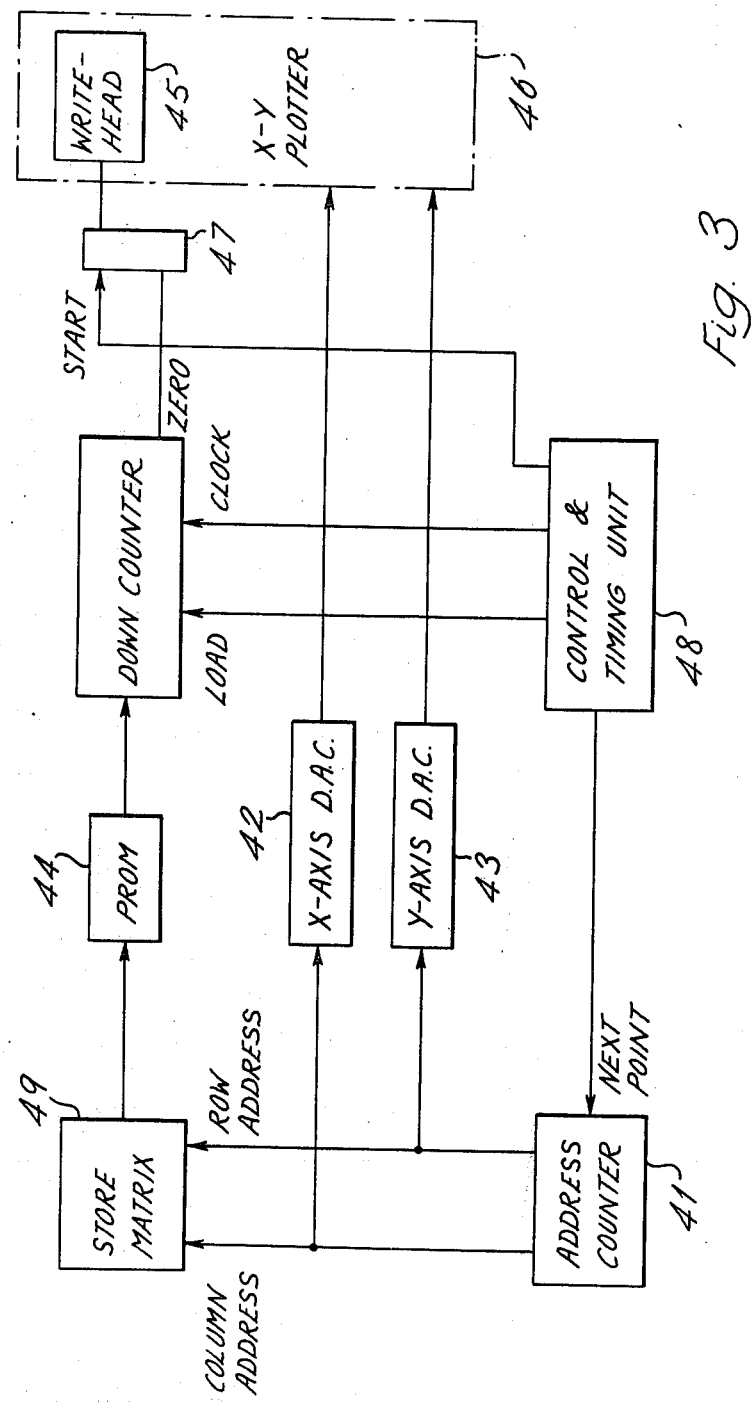
FIG. 3 illustrates another embodiment feeding an XY plotter.

Although this second application describes the display of stored information on an oscilloscope the same technique is applicable for generating hard-copy output and this is described with reference to FIG. 3.

In this case, the data is read word by word under the control of an address counter 41. At the same time, the address counter drives an X axis DAC 42 and a Y axis DAC 43 which together generate a raster to position the writing head of the recording device in synchronism with the data read-out process. Each data point read from store is translated into a pulse of a certain time duration according to the PROM look-up store 44. The pulse is then used to control the writing elements 45 of the XY plotter 46. The writing element may be any device capable of forming in each picture element, for example a dot of variable size, a dot pattern of variable density, or an area of variable intensity or colour. Suitable writing elements include ink jets or paint sprays in which the size of the written dot is determined by the time for which an ink flow control valve is opened, thermal heads in conjunction with thermally sensitive paper in which the size of the eroded dot is controlled by the heater on-time, and light source (LED) head in conjunction with photographic paper and a light-tight enclosure for a single colour source varying intensities are obtained by controlling the light source on-time at each picture element. For a multiplicity of sources of different colours, colour mixing and shading is possible by switching the sources on in different combinations and for different times.

In all of these methods the technique of translating the data into a controlled pulse width according to a function which corrects for the non-linearity of the writing element and produces the desired relationship between the written picture element and the original data is an essential part.

We claim:

1. A display device comprising a parameter sensor, an analogue-to-digital converter to convert the output of the sensor to digital form, processor means for receiving digital signals from the converter and modifying the values of the said signals according to a non-linear scale, a counter, means for periodically transferring the digital signals from the processor means to the said counter, a constant rate clock pulse generator for stepping the counter, means for providing a sequence of timing signals each commencing with the transfer of a digital signal to the counter and terminating when the counter reaches a preset count, and display means giving an analogue visual indication of the durations of each of the timing signals in the said sequence.

2. A display device comprising a digital store having a plurality of position defining addresses, means for reading the contents of the addresses in an ordered sequence, processor means for modifying the values of the read contents according to a non-linear scale, a counter to which digital signals representing said modified values are sequentially transferred, a constant rate clock pulse generator for stepping the counter, means for providing a sequence of timing signals each commencing with the transfer of a digital signal to the counter and terminating when the counter reaches a preset count, and display means giving analogue visual indications at locations defined in accordance with the positions of said addresses of the durations of each of the timing signals in the said sequence.

3. The device as claimed in claim 2 in which the counter comprises a down counter and the said preset count is zero.

4. The device as claimed in claim 2 in which the store is in the form of a matrix of rows and columns of addresses and in which the addresses are read row by row in a scanning sequence.

5. The device as claimed in claim 2 in which the display means comprises an oscilloscope.

6. The device as claimed in claim 5 in which the timing signals operate to switch the oscilloscope beam on and off.

7. The device as claimed in claim 6 and including deflection control means which causes the beam to scan over a raster and hold the beam at each of a succession of points in the raster at positions corresponding to said position defining addresses for constant durations at least equal to the maximum duration during which said timing signal is on.

8. The device as claimed in claim 5 in which the oscilloscope includes spot wobbling means.

9. The device as claimed in claim 2 in which the processor means provides an output proportional to the antilogarithm of the input.

* * * * *